US005747593A

United States Patent [19]

Nozawa et al.

[11] Patent Number: 5,747,593
[45] Date of Patent: May 5, 1998

[54] PROCESS FOR PRODUCING RUBBER-MODIFIED STYRENE RESIN

[75] Inventors: Masayuki Nozawa, Ichihara; Yasuji Shichijo, Kisarazu; Masanari Fujita, Kisarazu, all of Japan

[73] Assignee: Nippon Steel Chemical Co., Ltd., Tokyo, Japan

[21] Appl. No.: 586,658

[22] PCT Filed: Jul. 5, 1994

[86] PCT No.: PCT/JP94/01088

§ 371 Date: Mar. 22, 1996

§ 102(e) Date: Mar. 22, 1996

[87] PCT Pub. No.: WO95/02618

PCT Pub. Date: Jan. 26, 1995

[30] Foreign Application Priority Data

Jul. 14, 1993 [JP] Japan .................................. 5-195636

[51] Int. Cl.⁶ .................................................. C08F 279/02
[52] U.S. Cl. ........................... 525/193; 525/244; 525/316
[58] Field of Search ............................ 525/193, 244, 525/316

[56] References Cited

U.S. PATENT DOCUMENTS 3,144,420  8/1964  Fryling ........................... 525/193

FOREIGN PATENT DOCUMENTS

| 43-13983 | 6/1968 | Japan . |
| 62-34327 | 7/1987 | Japan . |
| 4-366116 | 12/1992 | Japan . |
| 5-125104 | 5/1993 | Japan . |
| 5-239159 | 9/1993 | Japan . |
| 6-9732 | 1/1994 | Japan . |

*Primary Examiner*—Irina S. Zemel
*Attorney, Agent, or Firm*—Darby & Darby

[57] ABSTRACT

An object of the present invention is to provide a process for producing rubber-modified styrene resins in which a distribution of the diameters of the rubber particles is narrow and the impact resistance is well balanced with the elastic modulus. The constitution thereof is characterized in that an aromatic monovinyl series monomer, a rubbery polymer and a styrene polymer are mixed and dissolved, and the mixed solution is adjusted so that the relation of the content R (wt. %) of the rubbery polymer contained in said mixed solution with the content Ps (wt. %) of the styrene polymer satisfies $0.2 < Ps/R < 3$; the solution is further subjected to pre-heating treatment to maintain the conditions before rubber phase inversion, and then rubber phase inversion is carried out in a plug flow type reactor followed by polymerizing to enhance the polymerization conversion rate in the following plug flow type reactor.

5 Claims, No Drawings

PROCESS FOR PRODUCING RUBBER-MODIFIED STYRENE RESIN

TECHNICAL FIELD

The present invention relates to a process for producing a rubber-modified styrene resin in which the impact resistance is well balanced with the elastic modulus.

BACKGROUND ART

In a process for producing rubber-modified styrene resins, a rubbery polymer is dissolved in an aromatic monovinyl series monomer, and the solution is subjected to bulk or solution polymerization which turns the rubbery polymer into dispersed rubber particles and is further followed by bulk or solution polymerization, or suspension polymerization. However, since bulk or solution polymerization is a continuous polymerization system, it is more efficient and economical then suspension polymerization, which is usually a batch-wise polymerization system, but it is inferior in producing a proper balance between the impact resistance and the elastic modulus of the resulting resin.

U.S. Pat. No. 3,144,420 and the Japanese patent No. Sho. 60-398282 disclose processes in which a polystyrene polymer is added to raw materials before starting polymerization in a continuous polymerization process. However, since in these processes a rubbery polymer is subjected to phase inversion to turn into dispersed particles, the diameter size distribution of the rubber particles dispersed in a resin is broad, and the effect of an improvement in a balance between the impact resistance and the elastic modulus of a resultant resin is insufficient.

The Japanese Patent 62-34327, using a similar process, discloses a process for improving the coloring property of a resin in which a combination of a rubbery polymer and an aromatic monovinyl series monomer is mixed with a styrene polymer solution (which maintains the system at a partial polymerization stage) to force the rubbery polymer into dispersed particles and further continue polymerization. However, this process is still insufficient in terms of an effect of the improvement in a balance between an impact resistance and an elastic modulus. The present invention relates to a process for producing rubber-modified styrene resins in which such conventional techniques as described above are improved.

DISCLOSURE OF THE INVENTION

An object of the present invention is to provide a process for producing, in a continuous bulk polymerization system, rubber-modified styrene resins in which a distribution in the diameters of rubber particles is narrow and the impact resistance is well balanced with the elastic modulus. We have found that the polymerization reaction which takes place before the polymerization conversion rate reaches a rate in which the rubber phase of the rubbery polymer is inverted from a continuous phase to a dispersion phase, exerts very large influence in controlling the shape of the styrene resin of the rubber particles and the diameter distribution of the rubber particles.

It has been found that the object described above can be achieved by supplying a solution prepared by mixing a rubber syrup solution, comprising an aromatic monovinyl series monomer and a rubbery polymer, with a styrene polymer in a specific range in a plug flow type reactor and promoting the polymerization in such a specific condition that the rubber phase is inverted. The present invention has been completed based on this knowledge.

That is, the present invention relates to a process for producing a rubber-modified styrene resin, comprising:

subjecting a raw material solution comprising 0 to 30 weight parts of a solvent blended with 100 weight parts of a mixed solution—which itself is prepared by mixing an aromatic monovinyl series monomer, a rubbery polymer and a styrene polymer in the ranges of 60 to 95 weight %, 3 to 10 weight %, and 2 to 30 weight %, respectively and which is adjusted so that the relation of the content R (wt. %) of the rubbery polymer contained in said mixed solution with the content Ps (wt. %) of the styrene polymer satisfies $0.2 < Ps/R < 3$— and a state before rubber phase inversion is maintained, subjecting said solution to preheating treatment up to 70° to 120° C. with a pre-heater so that a condition before the rubber phase inversion can be maintained and polymerization conversion rate of the aromatic monovinyl series monomer is within a range of 10 weight t or less, feeding continuously the raw material solution into a plug flow type reactor from one end of the inlet thereof to carry out the rubber phase inversion while continuing the polymerization reaction to thereby form prescribed dispersed rubber particles, feeding a polymerization solution drawn out of the outlet and successively into the following plug flow type reactor to enhance the polymerization conversion rate, and then carrying out devolatilization treatment to remove the unreacted monomer and the solvent.

Also, the present invention relates to a process for producing rubber-modified styrene resins, wherein 90 weight t or more of the rubber polymer comprises polybutadiene rubber and/or styrene-butadiene rubber of which solution viscosity of the 5 wt. % solution in styrene (SV value) at 25° C. falls in a range of 10 to 500 cps. Further, the present invention relates to a process for producing rubber-modified styrene resins, wherein 0.01 to 0.2 weight part of an organic peroxide per 100 weight parts of the raw material solution after carrying out the pre-heating treatment is added, and said raw material solution is fed into a plug flow type reactor.

The present invention will be explained below in detail.

In the process of the present invention, styrene alone, or a mixture thereof with other vinyl series monomers to be copolymerizable with styrene can be given as an aromatic monovinyl series monomer. The above copolymerizable monomers include, for example, aromatic monovinyl compounds such as α-methylstyrene, o-methylstyrene, m-methylstyrene, p-methylstyrene, vinylethylbenzene, vinylxylene, and vinylnaphthalene, methyl methacrylate, ethyl methacrylate, methyl acrylate, ethyl acrylate, acrylonitrile, methacrylonitrile, methacrylic acid, acrylic acid, maleic anhydride, phenyl maleimide and halogen-containing vinyl series monomers. These copolymerizable monomers may be used either alone or in combination of two or more kinds. They are used usually in a proportion of 30 weight % or less, preferably 10 weight % or less based on the whole aromatic monovinyl series monomers including styrene.

In the process of the present invention, the rubbery polymer used as an other component of the raw materials includes polybutadiene, a styrene-butadiene copolymer, polyisoprene, a butadiene-isoprene copolymer and natural rubber. Ninety % or more of the rubbery polymer is polybutadiene rubber, styrene-butadiene rubber or a mixture of polybutadiene rubber and styrene-butadiene rubbers.

Polybutadiene may be either low cis-polybutadiene rubber or high cis-polybutadiene rubber, or a mixture of low cis-polybutadiene rubber and high cis-polybutadiene rubber. The styrene-butadiene copolymer may be either a random type having a styrene content of 2 to 40 weight % or a block type or taper type, or a mixture thereof.

These rubbery polymers may be used singly or in combination of two or more kinds.

Further, the solution viscosity (SV value) of the 5 wt. % solution of rubbery polymer in styrene at 25° C. is required to fall in a range of 10 to 500 cps, preferably 25 to 350 cps.

A solution viscosity (SV value) of less than 10 cps tends to make rubber particles diameters too small and lowers impact resistance of the resin, and as such it is not preferred. In cases that the solution viscosity is 500 cps or more, the rubber is relatively expensive and therefore that is economically disadvantageous.

The blending amount of such rubbery polymer contained in the mixed solution is required to fall in a range of 3 to 10 weight %. If the amount of the rubber polymer contained in the mixed solution is less than 3 weight %, the impact resistance of the resulting rubber-modified styrene resins will be insufficient, and if it is 10 weight % or more, the bending elastic modulus of the resin is reduced too much while the impact resistance is improved, and therefore that is not practical.

Further, in the production process of the present invention, a polystyrene resin is mixed and dissolved within a specific range in a rubber syrup solution comprising the aromatic monovinyl series monomer and the rubber polymer. The polystyrene resin dissolved here may be commercially available polystyrene resin pellets or a polystyrene resin obtained directly from a polymerizing line for a polystyrene resin or a mixed solution in which a polystyrene resin is dissolved in the aromatic monovinyl series monomer at a partial polymerization stage.

In the polystyrene resin to be mixed, the reduced viscosity ($\eta$) preferably satisfies a range of $0.6<\eta<1.4$.

The $\eta$ of 0.6 or less reduces the impact resistance of the resulting rubbery styrene resin. Meanwhile, the $\eta$ of 1.4 or more makes it difficult for the polystyrene resin to be mixed and dissolved in the rubber syrup solution and therefore results in deteriorating the physical properties of the rubbery styrene resin and providing no effects of the present invention.

During mixing and dissolving, it is important that the aromatic monovinyl series monomer, the rubbery polymers and the styrene polymers are mixed and dissolved in the ranges of 60 to 95 weight %, 3 to 10 weight %, and 2 to 30 weight %, respectively; and that the relation of the content R (wt. %) of the rubbery polymer contained in the above mixed solution with the content Ps (wt. %) of the aromatic monovinyl polymer fall in the range of $0.2<Ps/R<3$ and that the state before rubber phase inversion is maintained.

The ratio Ps/R of 0.2 or less provides the insufficient effect on an improvement in the distribution in the diameters of the rubber particles dispersed in the resin, and the ratio Ps/R of 3 or more reduces the strength of the resulting resin.

Further, if the rubber phase is already inverted when the mixed solution is prepared, the distribution in the diameters of the dispersed rubber particles deteriorates very much, which is not preferred.

In the present invention, in order to control the viscosity of the system, which is varied by dissolving the polystyrene resin in the rubber syrup solution, a solvent may be added to the above mixed solution according to necessity. There may be blended as the solvent, for example, at least one organic solvent selected from aromatic hydrocarbons such as benzene, toluene, xylene, ethylbenzene, and diethylbenzene, and ketones such as methyl ethyl ketone within a range of 30 weight parts or less, preferably 10 to 20 weight parts per 100 weight parts of the mixed solution. In the present invention, the raw material solution has to be subjected to pre-heating treatment with a pre-heater in specific conditions before being fed into the plug flow reactor which prevents back mixing.

The type of pre-heater used is not specifically restricted, and a complete mixing bath equipped with a stirrer, or a shell and tube heat exchanger is preferred in terms of the ease of operation. The temperature condition for heating with the pre-heater varies depending on the kind and the amount of a polymerization initiator used, and falls preferably in a range of 70° to 120° C. A part of the aromatic monovinyl series monomer is polymerized at this heating temperature. The polymerization conversion rate thereof is 10 weight % or less of the aromatic monovinyl series monomer, and it is such that the condition before the rubber phase inversion is maintained. The polymerization conversion rate is preferably 5 weight % or less.

When the polymerization conversion rate exceeds 10 weight %, and the rubber phase is inverted in the pre-heater, the improvement in the distribution of rubber particles dispersed in the resulting resin is insufficient, and the results of the present invention are not obtained. In cases where the raw material solution is fed into the plug flow reactor without pre-heating, the rapid heating at the reactor's inlet can cause such problems as gel formation and its adherence to the reactor wall. Thus, the effective volume of the plug flow reactor is decreased, and heating and removing heat in the reactor does not stabilize the temperature condition and causes scattering in the quality of the product.

Organic peroxides used as polymerization initiators and chain transfer agents, oxidation inhibitors, mineral oil and silicon oil may suitably be added to the raw material solution according to necessity. Such additives may be added to the mixed raw material from the beginning or may be added in the middle of polymerization after the pre-heating stage.

In the present invention particularly, the organic peroxides are preferably added after carrying out the pre-heating treatment. The reason is that a part of an organic peroxide is susceptible to decomposition at pre-heating stage and thus it increases the polymerization conversion rate of the aromatic monovinyl series monomer. As a result the distribution in the rubber particle diameter deteriorates.

The raw material solution subjected to the pre-heating treatment is continuously fed to one end of the inlet of the plug flow reactor to carry out a polymerization reaction. Thus plug flow type reactor is of a structure in which a single or plural reactors are disposed in series.

The polymerizing temperature of the inside of this plug flow type reactor is usually controlled in the range of 100° to 180° C. In general, it is controlled so that a temperature gradient which shows a temperature increase along the flow direction is formed. There can be used as the plug flow type reactor, for example, a column type plug flow reactor equipped with a stirrer and a static mixer type plug flow reactor as proposed in Japanese Patent Laid-Open No. Sho 63-238101.

In general, since the viscosity of the polymerization solution increases as the polymerization proceeds, the polymerization is preferably carried out in the column type plug flow reactor equipped with a stirrer in a region of the early stage of the polymerization and of relatively low viscosity in which a rubber phase inversion takes place and the rubbery polymer is turned into dispersed particles. In particular, the polymerization in this region is carried out in a reactor having no plug flow property. For example, a complete mixing type reactor and static mixer type reactors disposed loopwise deteriorate a distribution in the diameters of the rubber particles dispersed in the resulting resin, and the impact resistance is therefore reduced.

Means for controlling shearing speed of the polymerizing solution has to be provided in order to control the diameters of the dispersed particles of the rubbery polymer.

A suitable reactor for this purpose is, preferably, of a long and narrow vertical column type which can produce a shearing action with a stirrer capable of changing the revolution number in the horizontal plane without causing a substantial back mixing.

In such vertical column type plug flow reactor equipped with a stirrer, the rubber phase inversion is caused while continuing the polymerization reaction, and the rubbery polymer is granulated. It is important to continue the polymerization reaction while maintaining the weight average particle diameter of the rubber particles in a desired range by controlling the stirring speed of the stirrer.

It is possible to make the relation of the stirring speed with the weight average particle diameter of the rubber particles suitable by controlling the solution viscosity (SV value) of the rubbery polymer.

At the latter stage where the viscosity is relatively high, and after the polymerization conversion has proceeded, and the rubber phase inversion has taken place, to turn the rubbery polymer into dispersed particles, a reactor composed of plural reactors disposed in series can be used so that the polymerization is carried out in a static mixer type plug flow reactor. In this case, the polymerization reaction is continued until the polymerization conversion rate of the aromatic monovinyl series monomer contained in the raw material solution reaches 60 to 98%.

The polymerizing solution which is obtained after the polymerization conversion rate reaches the prescribed level is subjected to devolatilization treatment with a devolatilization apparatus operating under reduced pressure while providing suitable heat treatment to remove the unreacted monomers and the solvent, thereby obtaining the desired rubber-modified styrene resin.

EXAMPLES

Best mode for carrying out the invention:

The present invention will be concretely explained below with reference to examples and comparative examples, but the present invention will by no means be restricted by these examples.

The physical properties of the resins were determined by the following methods:

(1) Measurement of a rubber particle diameter and a particle diameter distribution:

Two to three pieces of resin pellets are added to a methyl ethyl ketone/acetone mixed solvent to dissolve only the polystyrene parts thereof which form matrices, and then the undissolved rubber particle parts are separated with a centrifugal separator. Thereafter, the rubber particles are dispersed in a dimethylformamide electrolyte solution in a suitable concentration, and the diameters are measured with a coal tar counter (coal tar multicyzer model II) equipped with an aperture tube having a diameter of 30 μm.

(2) IZ impact strength (Kgf cm/cm) Determined based on JIS K-6871 (with a notch).

(3) Rubber content (Rc) Determined according to the WIS method.

(4) Bent elastic modulus ($Kg/mm^2$) Determined based on ASTM D-790.

Example 1

A raw material solution prepared by adding and dissolving 10 weight parts of ethylbenzene and 0.015 weight parts of n-dodecylmercaptan per 100 weight parts of a mixed solution (Ps/R=2/5) which itself was prepared by dissolving 79 weight parts of styrene, 6 weight parts of low cis-polybutadiene rubber (SV value: 85 cps) and 15 weight parts of polystyrene, was continuously fed into a complete stirred-mixing tank type pre-heater having a volume of 25 liter at a supply speed of 30 l/hr and was heated up to 100° C. Then, the raw material solution was continuously fed in succession into the first reactor which was a stirrer-equipped column type plug flow reactor having a volume of 45 liter to carry out the polymerization. The polymerizing temperature in the inside of the first reactor was controlled so that a temperature gradient which showed a temperature rise along the flow direction within the range of 100° to 115° C. was formed.

The polymerization conversion rate of styrene based on the monomer contained in the raw material was 2.1% at the outlet of the pre-heater, and the rubbery polymer was not yet subjected to phase inversion. The polymerization was carried out in the first reactor while stirring, and as a result, the polymerizing solution was in the condition that the phase inversion was finished at the outlet of the first reactor. Then, the polymerizing solution described above was continuously fed into the second reactor composed of three 50 liter static mixer type plug flow reactors disposed in series, and the polymerization was continued to cause the polymerization to proceed until the polymerizing solution conversion rate of styrene reached 88%. The volatile components were removed from the polymerizing solution under pressure while providing heat treatment at 230° C. Finally, the polymerizing solution was pelletized with a two-shaft extruding machine equipped with three vents. The physical properties of the resulting resin are shown in Table 1.

Example 2

Experiment was carried out in the same conditions as those in Example 1, except that the mixed solution, was (Ps/R=0.5) prepared by dissolving 91 weight parts of styrene, 6 weight parts of styrene-butadiene rubber (SV value: 350 cps and styrene content: 5 wt. %) and 3 weight parts of polystyrene, and 0.02 weight parts of 1,1-di-tert-butylperoxycyclohexane per weight parts of the mixed solution was added to the mixed solution at the outlet of the pre-heater. The physical properties of the resulting resin are shown in Table 1.

Comparative Example 1

Experiment was carried out in the same conditions as Example 1, except that the mixed solution was prepared by dissolving 94 weight parts of styrene and 6 weight parts of styrene-butadiene rubber (SV value: 350 cps and styrene content: 5 wt. %) was used. The physical properties of the resulting resin are shown in Table 1. Addition of polystyrene to the raw material did not result in deteriorating the distribution of the diameters of the rubber particles and lowering the bent elastic modulus.

Example 3

Experiment was carried out in the same conditions as Example 1, except that the mixed solution (Ps/R=2) was prepared by dissolving 89.5 weight parts of styrene, 3.5 weight parts of high cis-polybutadiene rubber (SV value: 170 cps) and 7 weight parts of polystyrene, and the raw material solution was prepared by adding and dissolving 10 weight parts of ethylbenzene and 0.015 weight parts of n-dodecylmercaptan per 100 weight parts of the mixed solution was used. The physical properties of the resulting resin are shown in Table 1.

Example 4

Experiment was carried out in the same conditions as Example 1, except that the mixed solution was prepared by dissolving 93 weight parts of styrene-butadiene rubber (SV value: 350 cps and styrene content: 5 wt. %) and 3.5 weight parts of polystyrene, and the raw material solution was (Ps/R=1) prepared by adding and dissolving 10 weight parts of ethylbenzene and 0.015 weight parts of n-dodecylmercaptan per 100 weight parts of the mixed solution was used. The physical properties of the resulting resin are shown in Table 1.

Comparative Example 2

Experiment was carried out in the same conditions as Example 1, except that the mixed solution (Ps/R=4) was prepared by dissolving 82.5 weight parts of styrene, 3.5 weight parts of low cis-polybutadiene rubber (SV value: 170 cps), and 14 weight parts of polystyrene; and the raw material solution was prepared by adding and dissolving 10 weight parts of ethylbenzene, and 0.015 weight parts of n-dodecylmercaptan per 100 weight parts of the mixed solution. The physical properties of the resulting resin are shown in Table 1.

Since the amount of polystyrene contained in the raw material exceeds the range in the present invention, the IZ strength is lowered.

Example 5

Experiment was carried out in the same conditions as Example 1, except that the mixed solution (Ps/R=2.8) was prepared by dissolving 66 weight parts of styrene, 9 weight parts of styrene-butadiene rubber (SV value: 25 cps and styrene content: 4 wt. %) and 25 weight parts of polystyrene, and the raw material solution—which was prepared by adding and dissolving 25 weight parts of ethylbenzene and 0.015 weight parts of n-dodecylmercaptan per 100 weight parts of the mixed solution—was used. The physical properties of the resulting resin are shown in Table 1.

Example 6

Experiment was carried out in the same conditions as Example 1, except that the mixed solution (Ps/R=2) was prepared by dissolving 73 weight parts of styrene, 4.5 weight parts of styrene-butadiene rubber (SV value: 25 cps and styrene content: 4 wt. %), 4.5 weight parts of low cis-polybutadiene rubber (SV value: 85 cps) and 18 weight parts of polystyrene, and the raw material solution—which was prepared by adding and dissolving 25 weight parts of ethylbenzene, 0.015 weight parts of n-dodecylmercaptan and 0.04 weight parts of 1,1-di-tert-butylperoxycyclohexane per 100 weight parts of the mixed solution—was used. The SV value of the mixture of the styrene-butadiene rubber (SV value: 25 cps and styrene content: 4 wt. %) and low cis-polybutadiene rubber (SV value: 85 cps) mixed in a weight ratio of 1:1 was 45 cp. The physical properties of the resulting resin are shown in Table 1.

TABLE 1

|  | Example | | | | | | Comp. Example | |
| --- | --- | --- | --- | --- | --- | --- | --- | --- |
|  | 1 | 2 | 3 | 4 | 5 | 6 | 1 | 2 |
| Rubber content in mixed solution: R | 6 | 6 | 3.5 | 3.5 | 9 | 9 | 6 | 3.5 |
| Ps content in mixed solution: Ps | 15 | 3 | 7 | 3.5 | 25 | 18 | 0 | 14 |
| Ps/R ratio in mixed solution | 2.5 | 0.5 | 2 | 1 | 2.8 | 2 | 0 | 4 |
| SV value of rubber (cps) | 85 | 350 | 170 | 350 | 25 | 45 | 350 | 170 |
| EB addition amount to mixed solution | 10 | 10 | 10 | 10 | 25 | 25 | 10 | 10 |
| PO addition amount to mixed solution (ppm) | 0 | 200 | 0 | 0 | 0 | 400 | 0 | 0 |
| SM polymerization rate at outlet of pre-heater | 2.1 | 5.2 | 1.6 | 1.8 | 2.6 | 8.3 | 2.5 | 1.6 |
| Rubber content in product (wt %) | 6.7 | 7 | 3.9 | 4.1 | 10.3 | 10.7 | 7 | 4.2 |
| Average diameter of rubber particle in product (μ) | 2.3 | 2.5 | 2.2 | 2.5 | 2.2 | 2 | 2.3 | 2.8 |
| Distribution of diameters of rubber particles (Dw/Dn) | 1.45 | 1.43 | 1.5 | 1.46 | 1.48 | 1.5 | 1.71 | 1.45 |
| IZOD impact strength (Kgfcm/cm$^2$) | 8.5 | 9 | 5.1 | 5.5 | 14 | 14.8 | 8.5 | 3.3 |
| Bent elastic modulus (Kgf/mm$^2$) | 227 | 220 | 259 | 255 | 194 | 186 | 197 | 260 |

Comparative Example 3

Experiment was carried out in the same conditions as in Example 1, except that the mixed solution (Ps/R=2.8) was prepared by dissolving 66 weight parts of styrene, 9 weight parts of styrene-butadiene rubber (SV value: 25 cps and styrene content: 4 wt. %) and 25 weight parts of polystyrene. The raw material solution was prepared by adding and dissolving 25 weight parts of ethylbenzene and 0.015 weight parts of n-dodecylmercaptan per 100 weight parts of the mixed solution. The pre-heating temperature of the pre-heater was set at 110° C.

The raw material solution at the outlet of the pre-heater was in the condition that a part of the rubbery polymer had already been turned into dispersed particles. The physical properties of the resulting resin are shown in Table 2. The distribution of the diameters of the rubber particles was deteriorated, and the bent elastic modulus was lowered.

Comparative Example 4

The raw material solution was prepared by adding and dissolving 10 weight parts of ethylbenzene, and 0.015 weight parts of n-dodecylmercaptan in 100 weight parts of the mixed solution (Ps/R=1), which was prepared by dissolving 88 weight parts of styrene, 6 weight parts of low cis-polybutadiene rubber (SV value: 170 cps) and 6 weight parts of polystyrene. The solution was continuously fed into a complete mixing bath type pre-heater having a volume of 25 liter at a supply speed of 30 1/hr to be heated up to 100° C. Then, the whole amount of the raw material solution was continuously fed in succession into the first reactor which was a complete stirred tank type reactor having a volume of 49 liter to carry out the polymerization. The polymerizing temperature in the inside of the first reactor was controlled to 125° C.

The rubbery polymer was not yet subjected to phase inversion at the outlet of the pre-heater, and the polymerization was carried out in the first reactor while stirring. As a result, the polymerizing solution was in the condition that the phase inversion was finished at the outlet of the reactor.

Then, the entire polymerizing solution described above was continuously fed into a second reactor composed of three static mixer type plug flow reactors disposed in series, and the polymerization was continued to cause the polymerization to proceed until the polymerization conversion rate of styrene reached 86%. This polymerizing solution was pelletized with a two-shaft extruding machine equipped with three vents after removing volatile components under reduced pressure while providing heat treatment at 230° C. The physical properties of the resulting resin are shown in Table 2.

Since the phase inversion took place in the first reactor which was the complete mixing tank type reactor, the distribution of the diameters of the rubber particles was deteriorated, and the Izod strength was lowered as well.

TABLE 2

|  | Comp. Example | |
| --- | --- | --- |
|  | 3 | 4 |
| Rubber content in mixed solution | 9 | 6 |
| Ps addition amount in mixed solution | 25 | 6 |
| Ps/R ratio in mixed solution | 2.8 | 1 |
| SV value of rubber (cps) | 25 | 170 |
| EB addition amount to mixed solution | 25 | 10 |
| PO addition amount to mixed solution (ppm) | 0 | 0 |
| Conversion rate at outlet of pre-heater (wt %) | 13.2 | 2.5 |
| Rubber content in product (wt %) | 10 | 6.9 |
| Average diameter of rubber particles in product | 2.3 | 2.5 |
| Distribution of diameters of rubber particles (Dw/Dn) | 1.74 | 2.13 |
| IZOD impact strength (Kgfcm/cm$^2$) | 9.2 | 6.9 |
| Bent elastic modulus (Kgf/mm$^2$) | 187 | 195 |

Industrial Applicability

According to the method of the present invention, the rubber-modified styrene resins in which the distribution of the diameters of rubber particles is narrow and the impact resistance is well balanced with the elastic modulus can easily be produced, and the industrial usefulness thereof is great.

We claim:

1. A process for producing a rubber-modified styrene resin, comprising:

subjecting a raw material solution comprising 0 to 30 weight parts of a solvent blended with 100 weight parts of a mixed solution which is prepared by mixing a monovinyl monomer, a rubbery polymer and a styrene polymer in the ranges of 60 to 95 weight %, 3 to 10 weight %, and 2 to 30 weight %, respectively, and which is adjusted so that the relation of the content R (wt. %) of the rubbery polymer with the content Ps (wt. %) of the styrene polymer contained in said mixed solution satisfies 0.2<Ps/R<3 and which is adjusted so that a rubber phase is not inverted, subjecting said raw material solution to pre-heating to 70° to 120° C. with a pre-heater so that the rubber phase inversion does not occur and the polymerization conversion rate of the monovinyl monomer is within the range of 10 weight % or less, and then feeding continuously the raw material solution into a first plug flow reactor from one end thereof to carry out the rubber phase inversion while continuing the polymerization reaction to thereby form prescribed dispersed rubber particles, feeding a polymerization solution drawn out of the other end of said first plug flow reactor successively into following plug flow reactors to enhance the polymerization conversion rate, and then carrying out a devolatilization treatment to remove the unreacted monomer and the solvent.

2. The process for producing the rubber-modified styrene resin of claim 1, wherein 90 weight % or more of the rubbery polymer comprises polybutadiene rubber and/or styrene-butadiene rubber wherein the solution viscosity of a 5 wt. % solution in styrene (SV value) at 25° C. is within the range of 10 to 500 cps.

3. A process for producing a rubber-modified styrene resin as described in claim 1, wherein 0.01 to 0.2 weight parts of an organic peroxide per 100 weight parts of the raw material solution after carrying out the pre-heating treatment is added, and said raw material solution is fed into the plug flow type reactor.

4. The process for producing the rubber-modified styrene resin of claim 1, wherein the polystyrene polymer to be admixed has a reduced viscosity ($\eta$) which is within the range of 0.6<$\eta$<1.4.

5. The process for producing the rubber modified styrene resin of claim 1, wherein the monovinyl monomer is selected from the group consisting of α-methylstyrene, o-methylstyrene, m-methylstyrene, p-methylstyrene, vinylethylbenzene, vinylxylene, vinylnaphthalene, methyl methacrylate, ethyl methacrylate, methyl acrylate, ethyl acrylate, acrylonitrile, methacrylonitrile, methacrylic acid, acrylic acid, maleic anhydride, phenyl maleimide, and halogen containing vinyl monomers, or a combination thereof.

* * * * *